(12) United States Patent  
Obersteiner

(10) Patent No.: US 8,714,807 B2
(45) Date of Patent: May 6, 2014

(54) BEATERS WITH A BEATER HEAD HAVING AN ADJUSTABLE LENGTH

(75) Inventor: Heimo Obersteiner, Klagenfurt (AT)

(73) Assignee: Koninklijke Philips N.V., Eindhoven (NL)

( * ) Notice: Subject to any disclaimer, the term of this patent is extended or adjusted under 35 U.S.C. 154(b) by 654 days.

(21) Appl. No.: 12/999,688

(22) PCT Filed: Jun. 26, 2009

(86) PCT No.: PCT/IB2009/052761
§ 371 (c)(1),
(2), (4) Date: Dec. 17, 2010

(87) PCT Pub. No.: WO2010/001315
PCT Pub. Date: Jan. 7, 2010

(65) Prior Publication Data
US 2011/0116341 A1 May 19, 2011

(30) Foreign Application Priority Data
Jul. 1, 2008  (EP) .................................... 08159382

(51) Int. Cl.
*A47J 43/07* (2006.01)
(52) U.S. Cl.
USPC .............................. 366/129; 366/286; 366/331

(58) Field of Classification Search
USPC .................................. 366/129, 286, 331, 344
See application file for complete search history.

(56) References Cited

U.S. PATENT DOCUMENTS

| 768,086 | A | * | 8/1904 | Sturma | 366/286 |
|---|---|---|---|---|---|
| 1,065,806 | A | * | 6/1913 | Hollingsworth | 366/286 |
| 1,738,112 | A | * | 12/1929 | Myers | 416/122 |
| 2,778,615 | A | * | 1/1957 | Hahn | 416/135 |
| 2,896,925 | A | * | 7/1959 | Place | 416/201 R |
| 5,584,112 | A | | 12/1996 | Diore et al. | |
| 5,979,850 | A | * | 11/1999 | Hippen et al. | 248/309.2 |
| 6,079,870 | A | | 6/2000 | Krzywdziak | |
| 6,113,258 | A | | 9/2000 | Ardent | |
| 6,234,662 | B1 | * | 5/2001 | Blake | 366/129 |
| 6,663,274 | B1 | * | 12/2003 | Rattenberger et al. | 366/129 |
| 2007/0133345 | A1 | | 6/2007 | Zarom | |
| 2007/0286014 | A1 | | 12/2007 | Lee | |

FOREIGN PATENT DOCUMENTS

| DE | 634390 | 7/1938 |
|---|---|---|
| GB | 2129322 A | 5/1984 |
| JP | 59162934 | 9/1984 |

* cited by examiner

*Primary Examiner* — Charles E Cooley

(57) ABSTRACT

A beater attachable to a drive motor for rotatingly driving the beater. The beater comprises a drive shaft having a distal end adapted to be coupled to the drive motor, and a beater head. The beater further including a beater head that is releasingly coupled to the drive shaft, so as to couple the beater head to the drive shaft along different relative positions thereof.

11 Claims, 3 Drawing Sheets

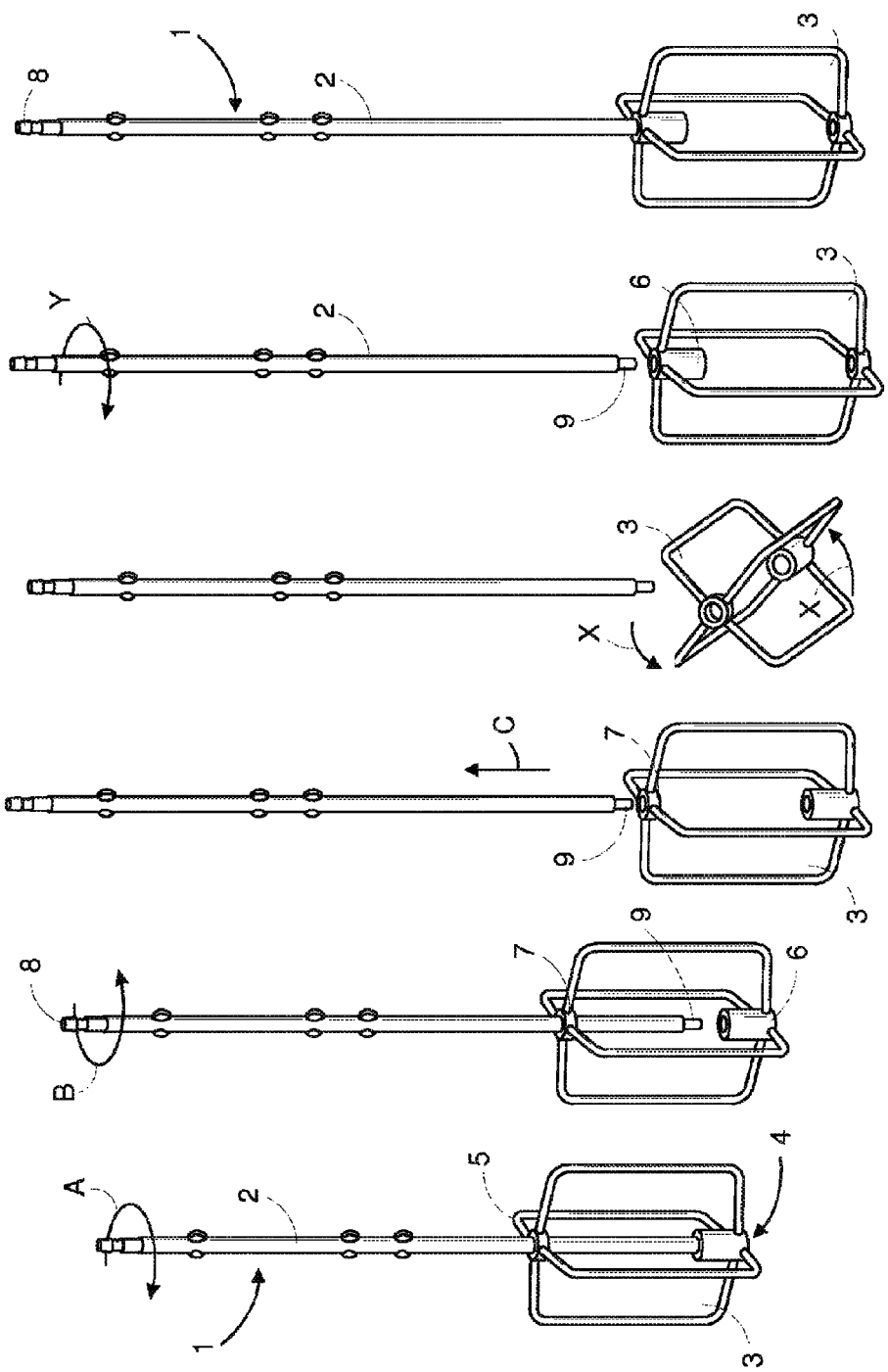

BEATERS WITH A BEATER HEAD HAVING AN ADJUSTABLE LENGTH

FIELD OF THE INVENTION

The present invention relates to beaters for example for use with hand mixers and in general relates to mixing devices provided with beaters.

BACKGROUND OF THE INVENTION

A beater, for example for use with hand mixers, food processors or generally kitchen appliances is widely known and used for mixing foodstuffs. Such a beater is attachable to a drive motor for rotatingly driving said beater. The common beater comprises a drive shaft having a first distal end which is adapted to be coupled to the drive motor of the mixing device. The beater further comprises a beater head, which stirs or mixes the foodstuff.

The known beater is useful in combination with, for example, a hand mixer and a bowl or container which contains the foodstuff to be mixed. Such mixers may employ one, two or even more beaters, depending on the requirements. In order to get good mixing results, the beater head should be able to reach the bottom of the bowl used. Even better mixing results are obtained when dedicated bowls having different shapes and sizes are used for different foodstuffs.

Unfortunately, known beaters have a fixed length which means that beaters of different lengths must be used and must be exchanged when using bowls of different heights, or that the beaters cannot reach the bottom of the bowl used in case the beaters are too short or that the beaters are too long which reduces the ease of use of the mixer.

Another type of known beaters is disclosed in U.S. Pat. No. 2,778,615 A. This patent document discloses a beater with resiliently yieldable blades. The resilient blades of this beater constitute a beater head which during use is rotated for performing the beating and mixing of foodstuff which is located in a bowl. At least one end of the blades disclosed by U.S. Pat. No. 2,778,615 A is fixedly connected to the drive shaft. When the blades hit the bowl wall, the blades will deform for adapting to the shape of the bowl. As the blades deform under contact with the bowl wear can occur on bowl and/or blade. During extended use the resilientness of the blades can diminish leading to a reduced functionality of the adaptivity of the blades to different bowls or even to a fracture of a blade.

OBJECT OF THE INVENTION

The present invention aims to provide a beater which overcomes the above-mentioned drawbacks and allows beaters to be used with bowls or container of different sizes, in particular of different heights.

SUMMARY OF THE INVENTION

The present invention overcomes the drawbacks of the known beaters by providing a beater which is attachable to a drive motor for rotatingly driving said beater, the beater comprising a drive shaft having a first distal end adapted to be coupled to the drive motor, and beater head, wherein the beater further comprises coupling means for releasingly coupling the beater head to the drive shaft. The beater according to the invention is detailedly defined in claim 1. Particularly, the beater according to the invention comprises coupling means for releasingly coupling the beater head to the drive shaft, so as to couple the beater head in at least two different positions relative to the drive shaft for changing the overall length of the beater.

By providing coupling means that can releasingly couple the beater head to the drive shaft, so that the beater head can be attached or coupled to the drive shaft along different positions of the drive shaft, i.e. such that the beater head and the drive shaft can be coupled in at least two different position relative to each other, the total length of the beater can be changed or adapted conveniently to the length, i.e. the height, of the container or bowl used. This means that only one beater is required instead of several different beaters, to be able to cover a range of different bowl heights. Also, when more than one beater is used, the beaters do not have to be of the same length and it becomes possible to get an improved mixing action when using relatively tall bowls for example. As the length of the beater is determined before the beating and/or mixing process starts, no contact between the bowl or container wall and the beater head is necessary to adapt the beater length.

Another advantage of the beater according to the invention is that the length of the beater can for example be reduced in order to improve storability of the beater or to improve its performance at high rotational speeds, i.e. reducing the occurrence of vibrations or wobbling by increasing its stiffness (i.e., rigidity).

Yet another advantage of the beater according to the invention is that the beater head is coupled releasingly to the drive shaft. Thus the beater head can be a separate or loose component which can be fully detached from the drive shaft. This allows the user to attach a beater head most suited for the beating and/or mixing task at hand to the drive shaft, thereby improving the performance of the beater. The beater head may be coupled to the drive shaft along different relative positions thereof. For instance, a different relative position might be reached by displacing the beater head with respect to the drive shaft, thus changing the relative location of the beater head and the drive shaft, or by changing the orientation of the beater head with respect to the drive shaft, thus changing the relative orientation of the beater head and the drive shaft.

In an embodiment the beater head can be coupled to the drive shaft in a first relative position in which the beater head substantially extends from the second distal end towards the first distal end of the drive shaft, and in a second relative position in which the beater head substantially extends from the second distal end away from the first distal end. This allows for example the beater head to be turned upside down and to be re-attached to the drive shaft, yielding at least two discrete lengths of the beater.

In a further embodiment the coupling means comprise a socket adapted to accommodate, at least partly, the second distal end of the drive shaft. This allows a good and stable coupling of the beater head with the drive shaft.

In a further embodiment the socket comprises fastening means that can co-operate with complementary fastening means provided on the drive shaft, which yields a secure coupling between the beater head and the drive shaft.

In a further embodiment, the fastening means comprise one of a thread fixation or a bayonet fixation. Fastening by means of threading or a bayonet coupling provide for an easy to use and secure coupling between the beater head and the drive shaft. Furthermore, this provides an easy to produce and easy to clean assembly.

In a further embodiment, the fastening means are self-locking when driven by the drive motor. In this manner the beater head will lock itself onto the drive shaft when driven by the drive motor and yields a very good coupling.

In a further embodiment the coupling means comprise clamping means which are arranged to exert a clamping force on the drive shaft during use of the beater, so that a secure coupling can be established between the beater head and the drive shaft along different positions of the drive shaft.

In a further embodiment the beater head can be coupled to the drive shaft in a first relative location in which the beater head substantially extends from the second distal end towards the first distal end of the drive shaft, and in a relative location in which the beater head substantially extends from the second distal end away from the first distal end. This allows for example the beater to be displaced along the drive shaft, yielding at least two discrete lengths of the beater.

In a further embodiment the beater head can be coupled to the drive shaft in a first orientation in which the beater head substantially extends from the second distal end towards the first distal end of the drive shaft, and in a second orientation in which the beater head substantially extends from the second distal end away from the first distal end. This allows for example the beater head to be turned upside down and to be re-attached to the drive shaft, yielding at least two discrete lengths of the beater.

In a further embodiment the beater is one of a strip beater, a wire beater, or a twisted-wire beater. In this manner an even more versatile beater is provided.

In a further embodiment the beater head is exchangeable, so that different beater heads can be connected or coupled to the drive shaft for different applications and a multifunctional beater is provided.

According to another aspect of the invention, a mixing device is provided comprising a beater as defined heretofore. Such a mixing device can be used in combination with bowls or containers of different height.

BRIEF DESCRIPTION OF THE DRAWINGS

Further advantageous embodiments of the beater and a mixing device comprising such a beater are described in the claims and in the following description with reference to the drawing, in which:

FIG. 1A-1F show a three-dimensional view of a beater according to the invention in a sequence of changing the orientation of the beater head;

DETAILED DESCRIPTION OF EXAMPLES

Figure 2A:
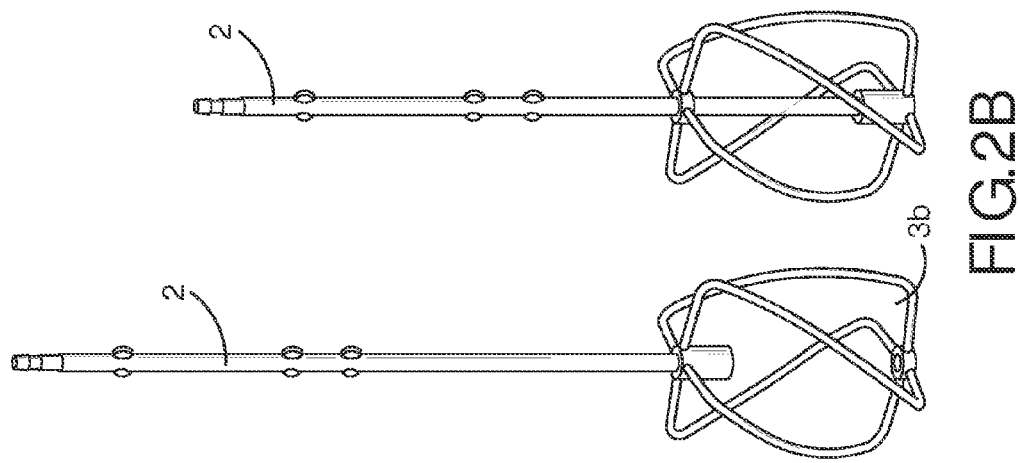
FIG. 2A-2B show two exchangeable beater heads in a three-dimensional view each in two orientations.

A first embodiment of a beater 1 is shown with reference to FIGS. 1A through 1F. The beater 1 comprises a rigid drive shaft 2 having a fixed length and a beater head 3 which can be attached or coupled to the drive shaft 2 by means of coupling means generally denoted by reference numeral 4. The beater head 3 is in the example of FIGS. 1A-1F a wire beater, comprising four wires 5 which extend in a general longitudinal direction between the coupling means comprising a first socket 6 and a second socket 7. Other designs of the beater head 3 are also possible. Examples of alternative designs of beater heads are presented in FIGS. 2A-2B. Furthermore, a different number of wires is possible or even completely different shapes, depending on the mixing purpose.

The beater 1 is attachable to a drive motor of, for example, a mixing device such a hand mixer (not shown) and can be rotatingly driven by said drive motor in a way which is known per se from the art. Such a hand mixer is for example used to mix foodstuffs, such as cream, eggs etcetera. However, more heavy duty mixing devices also use beaters, for example for mixing concrete in buckets or the like.

The drive shaft 2 has a distal end 8, in particular a first distal end 8, adapted to be coupled to the drive motor of the mixing device. In the embodiment of FIGS. 1A-1F the drive shaft 2 comprises a second distal end 9 which can be accommodated in the first socket 6 and can couple with the first socket 6 by means of a thread or bayonet coupling (not show in detail), in other words, fastening means and in particular complementary fastening means are provided. This allows the beater head 3 to be releasingly coupled with the drive shaft 2. Preferably, the thread or bayonet coupling is designed such, that upon action of the drive motor (indicated with arrow A in FIG. 1A) with the drive shaft 2 coupled therewith, the coupling between the beater head 3 and the drive shaft 2 is self-locking.

In the example of FIG. 1A, the drive shaft 2 extends through the second socket 7 and has its second distal 9 accommodated in the first socket 6. In this situation the beater head 3 is in a first orientation in which the beater head 3 substantially extends from the second distal end 9 of the drive shaft 2 towards the first distal 8 end of the drive shaft 2. In the orientation of FIG. 1A the beater 1 has its minimum length.

As the coupling means 4 are designed to releasingly couple the beater head 3 to the drive shaft 2, the beater head 3 can be released from the drive shaft 2. In this manner the beater head 3 can be coupled or attached to the drive shaft 2 along different relative positions thereof, so as to change the overall length of the beater 1. This is shown in FIGS. 1B to 1F.

Turning to FIG. 1B and FIG. 1C it is shown how the beater head 3 can be released, and in the example shown detached, from the drive shaft 2 by turning the drive shaft 2 in a counter-clockwise direction B and pulling it out of the beater head 3 in a direction indicated by arrow C until the second distal end 9 of the drive shaft 2 has cleared the second socket 7. In this situation the beater head 3 can either be exchanged for another beater head or as shown in FIG. 1D be rotated upside down as indicated by the arrows X. After rotating the beater head 3 the first socket 6 is now closest to the second distal end 9 of the drive shaft 2, whereas in the orientation of FIG. 1A the second socket was closest thereto. This is shown in FIG. 1E. Now the beater head 3 can be re-attached or coupled to the drive shaft 2 by turning the drive shaft 2 in a clockwise direction as indicated by arrow Y. By doing so the beater head 3 is firmly coupled with the drive shaft 2 in a second orientation in which the beater head 3 substantially extends from the second distal end 9 away from the first distal end 8 and wherein the beater 1 has its maximum length.

In comparison with the orientation of the beater head 3 of FIG. 1A the drive shaft 2 no longer extends through the second socket or ring 7 of the beater head 3. The effect of the drive shaft 2 extending through the second socket or ring 7 and into the first socket 6 is, that in the first situation the assembly of the beater head 3 and the drive shaft 2 will have a larger stiffness (i.e., rigidity) compared to the latter situation.

In practice this means that a user not only has a choice of length of the beater he wants to use, but can also adjust the overall stiffness (i.e., rigidity) of the beater 1 depending on the expected load on the beater 1 during use, for example in case very heavy or very viscous foodstuffs are to be mixed. By increasing the stiffness (i.e., rigidity) of the beater 1 the chance of wobbling under high loads can be reduced and the comfort of use of the mixer driving the beater will be increased.

Figure 2B:
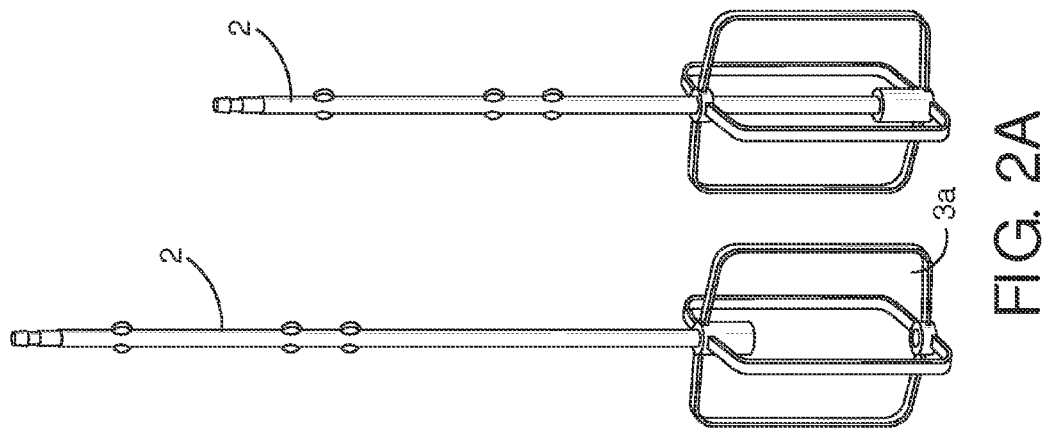

In FIGS. 2A, and 2B two alternative designs of beater heads 3a, 3b are shown. Each of the beater heads 3a, 3b is shown in two orientations and hence at two different relative positions along the drive shaft 2. FIG. 2A shows a strip beater 3a, FIG. 2B shows a twisted-wire beater 3b.

In the above examples the beater head 3 can be coupled to the drive shaft 2 by means of a thread or bayonet coupling. Another way of coupling the beater head 3 to the drive shaft 2 can for example use a click mechanism.

Yet another way of releasingly coupling the beater head 3 along different relative position to the drive shaft 2 is given with reference to FIGS. 3A and 3B, wherein a beater 1 is shown that has the same features as the beater described with reference to FIGS. 1A-2B except for the features mentioned below.

Figures 3A, 3B:
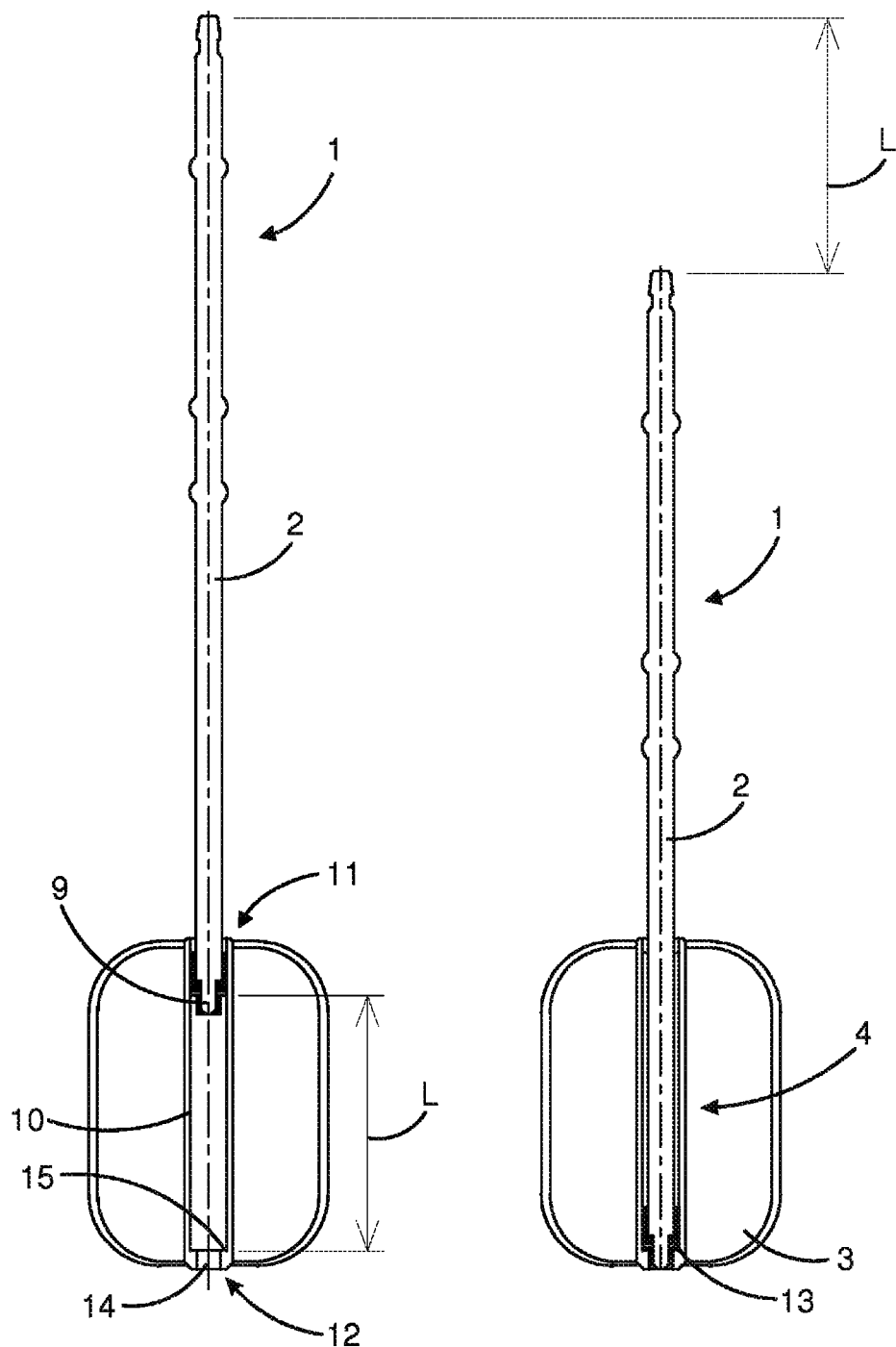
FIG. 3A-3B show, in a sectional view, a beater with a slideable beater head.

The beater 1 as shown in FIGS. 3A and 3B comprises an elongate socket or a sleeve 10 which substantially extends between an top end 11 and bottom end 12 of the beater head 3. The drive shaft 2 with its second distal end 9 is partly housed in the sleeve 10 at the top end 11 of the beater head 3. The elongate socket 10 is shaped as an elongate hollow tubular member, which is open at its distal ends. Between the second distal end 9 of the drive shaft 2 and the inner surface of the sleeve 11 the coupling means 4 comprise a clamping means 13. The clamping means 13 are operable between the drive shaft 2 and the socket 10 and exert a clamping force thereon to couple the beater head 3 to the drive shaft 2. The clamping means 13 are provided with rotational lock means that prohibit rotation around the drive shaft 2, but are displaceable along the length thereof. Such rotational lock means for example comprise one or more slots provided in the clamping means 13 that co-operate with one or more (elongate) notches on the drive shaft 2 or vice versa. In order to couple with the drive shaft 2, the clamping means 13 and the drive shaft 2 are provided with a threading. By threading the drive shaft 2 into the clamping means 13, the clamping means 13, which are preferably made from a resilient material, will be squeezed (i.e. its length will be reduced) and the cross-section will be increased. Due to its increase in cross-sectional direction the clamping means 13 will push against the inner surface of the socket 10 and clamp itself in place against the socket 10.

In the orientation or relative position of the beater head 3 on the drive shaft 2 shown in FIG. 3A the beater 1 has its maximum length. To arrive at the orientation or position of the beater head 3 as shown in FIG. 3B, the clamping means 13 are released so that the beater head 3 can be displaced along the drive shaft 2 over a distance L. In this position the beater 1 has its minimum length and the beater head 3 can again be coupled to the drive shaft 2 by actuating the clamping means 13. It is to be understood, that of course any position between the positions of the beater head 3 as shown in FIG. 3A respectively FIG. 3B can be chosen due to the nature of the clamping means 13 for which the sleeve 11 acts as a (telescopic) sliding shaft.

To maximize the distance L over which the beater head 3 can be displaced along the drive shaft 2, the elongate socket 10 has a through bore 14 at the bottom end 12 which has a diameter which is smaller than the inner diameter of the socket 10. This provides a support edge 15. Hence, the recessed lower end of the clamping means 13 can partly extend into said through bore 14 and at the same time the clamping means 13 can be supported by the support edge 15. Furthermore, this improves cleanability of the beater head 3 as socket 10 at the top end 11 is also open. In fact, the socket 10 is open at the top end 11 such that the beater head 3 can be removed from the drive shaft 2 completely as was shown with reference to FIGS. 1A-1F.

While the invention has been illustrated and described in detail in the drawings and in the foregoing description, the illustrations and the description are to be considered illustrative or exemplary and not restrictive. The invention is not limited to the disclosed embodiments. It is noted that the beater according to the invention and all its components can be made by applying processes and materials known per se. In the set of claims and the description the word "comprising" does not exclude other elements and the indefinite article "a" or "an" does not exclude a plurality. Any reference signs in the claims should not be construed as limiting the scope. It is further noted that all possible combinations of features as defined in the set of claims are part of the invention.

LIST OF FEATURES 1 beater
2 drive shaft
3 beater head
3a beater head
3b beater head
4 coupling means
5 wires
6 first socket
7 second socket
8 first distal end
9 second distal end
10 elongate socket
11 top end of beater
12 bottom end of beater
13 clamping means
14 through bore
15 support edge

The invention claimed is:

1. A beater attachable to a drive motor for rotatingly driving said beater, the beater comprising:
a beater head,
a rigid drive shaft having a fixed length and a first distal end adapted to be directly coupled to the drive motor and a second distal end adapted to be directly coupled to the beater head,
the beater further comprises coupling means for releasingly coupling the beater head to the drive shaft, so as to couple the beater head in at least two different positions relative to the drive shaft for changing the overall length of the beater between a first fixed length and a second fixed length, the coupling means comprise a first coupling member coupled to a first distal end of the beater head and a second coupling member coupled to a second distal end of the beater head,
wherein the beater head can be coupled to the drive shaft via said coupling means in a first orientation such that the second coupling member is closest to the first distal end of the drive shaft, and
wherein the beater head can be coupled to the drive shaft via said coupling means in a second orientation such that the second coupling member is furthest from the first distal end of the drive shaft.

2. Beater according to claim 1, wherein the beater head can be coupled to the drive shaft via said coupling means in a first relative location in which the beater head substantially extends from said second distal end of the drive shaft towards the first distal end of the drive shaft, and in a second relative location in which the beater head substantially extends from the second distal end away from the first distal end.

3. Beater according to claim 1, wherein the beater head can be coupled to the drive shaft via said coupling means in a first orientation in which the beater head substantially extends from a second distal end of the drive shaft, and in a second orientation in which the beater head substantially extends away from the first distal end.

4. Beater according to claim 1, wherein the first coupling member comprises a first socket adapted to accommodate, at least partly, the second distal end of the drive shaft.

5. Beater according to claim 4, wherein the socket comprises fastening means that can co-operate with complementary fastening means provided on the drive shaft.

6. Beater according to claim 5, wherein the fastening means comprise one of a thread fixation or a bayonet fixation.

7. Beater according to claim 5, wherein the fastening means are self-locking when driven by the drive motor.

8. Beater according to claim 1, wherein the beater is one of a strip beater, a wire beater, or a twisted-wire beater.

9. Beater according to claim 1, wherein the beater head is exchangeable.

10. A mixing device comprising a beater according to claim 1.

11. Beater according to claim 1, wherein the second coupling member comprises a socket or ring adapted to allow the drive shaft to extend therethrough in said first orientation.

* * * * *